UNITED STATES PATENT OFFICE.

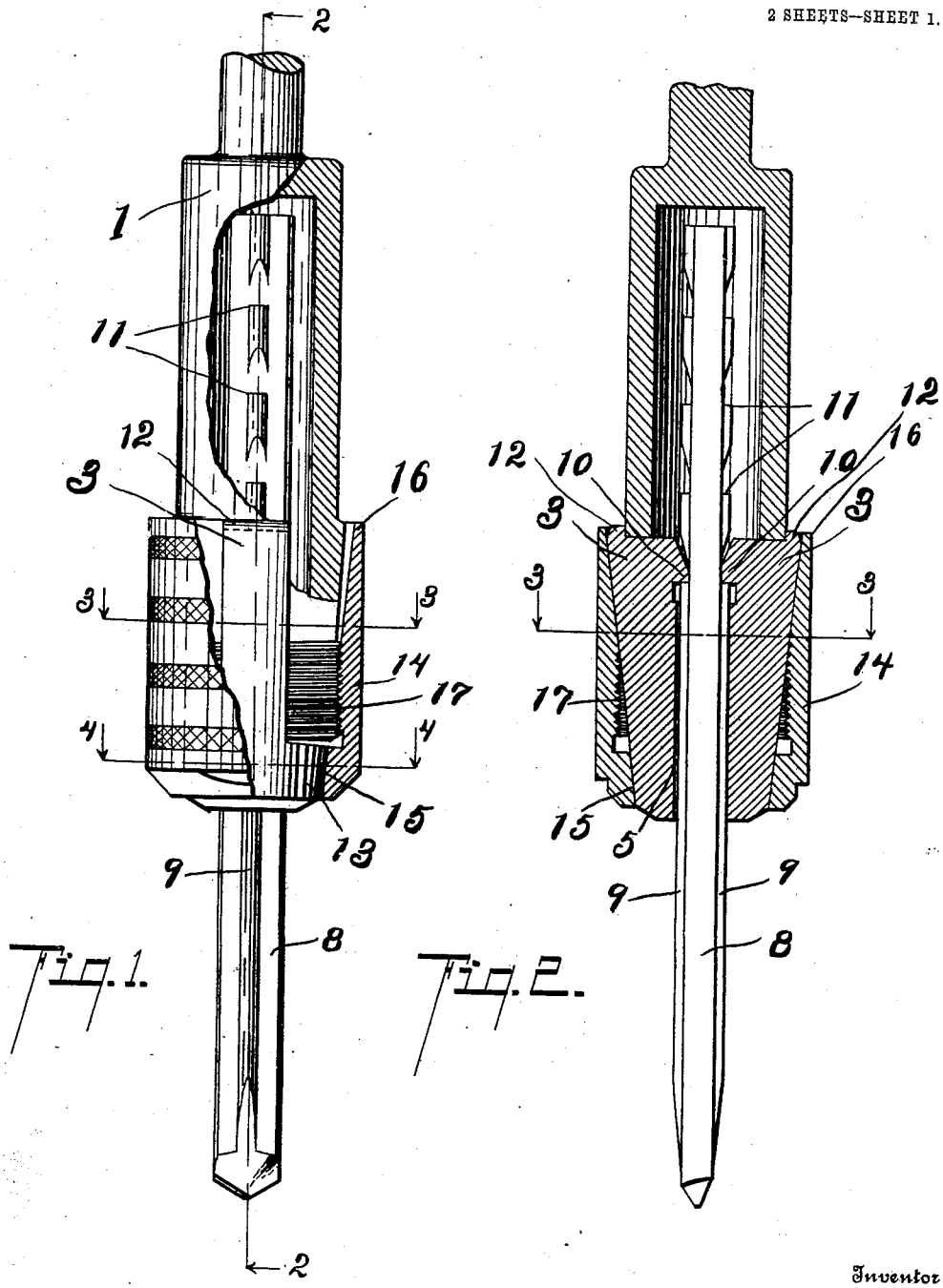

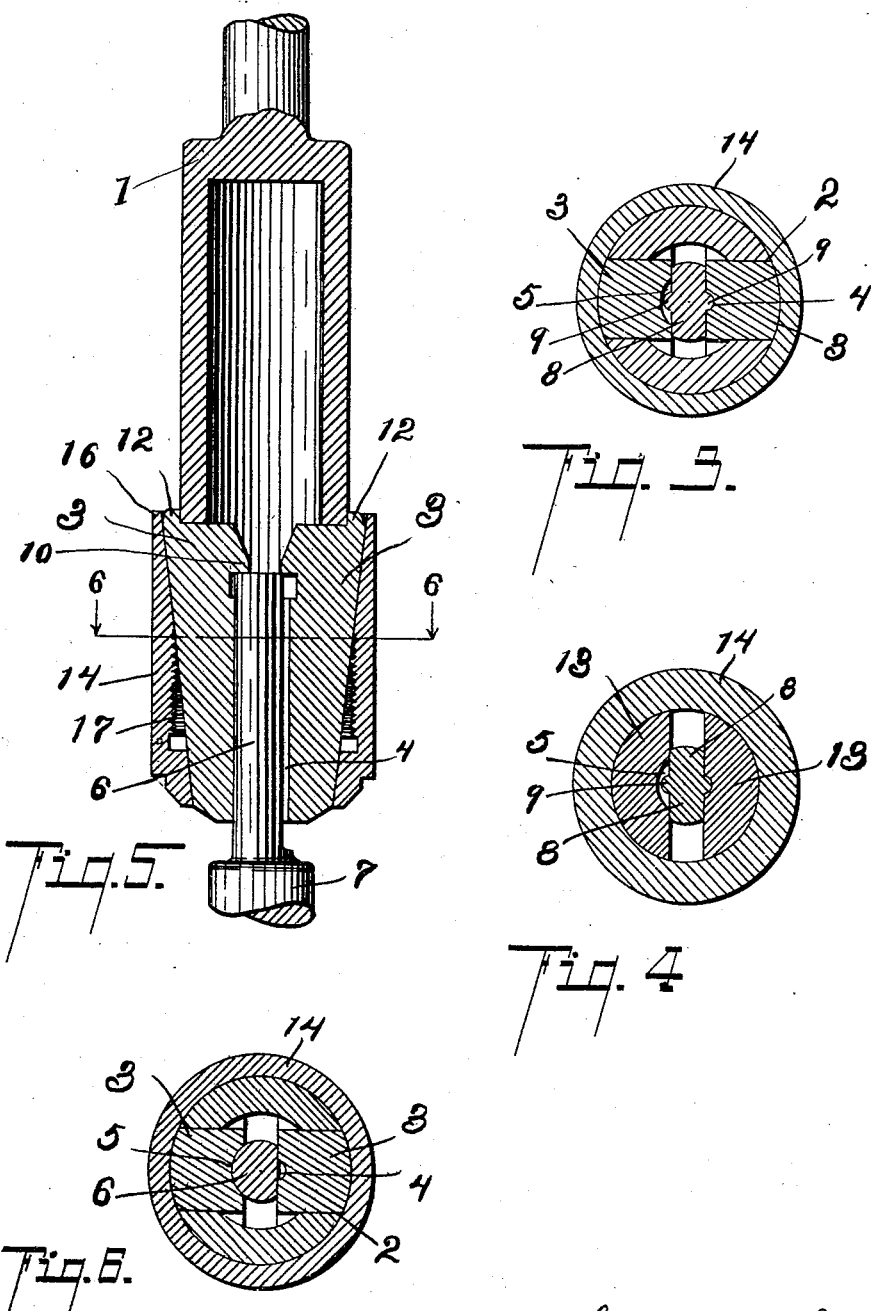

EUGENE COOK, OF KALAMAZOO, MICHIGAN.

CHUCK.

No. 912,448.    Specification of Letters Patent.    Patented Feb. 16, 1909.

Application filed August 24, 1907. Serial No. 390,007.

*To all whom it may concern:*

Be it known that I, EUGENE COOK, a citizen of the United States, residing in the city and county of Kalamazoo, State of Michigan, have invented certain new and useful Improvements in Chucks, of which the following is a specification.

This invention relates to improvements in chucks.

The main objects of this invention are, first, to provide an improved chuck adapted to hold drills having round shanks and also those having flat shanks; second, to provide an improved chuck adapted for use as above stated, in which the flat shank drills are adjustably supported; third, to provide an improved chuck which is simple in structure and very durable, and one which may be quickly adjusted.

Further objects, and objects relating to details of construction, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a side elevation of a structure embodying the features of my invention, parts being broken away to show the structural details; Fig. 2 is a detail longitudinal section taken on a line corresponding to line 2—2 of Fig. 1; Fig. 3 is a cross-section taken on a line corresponding to line 3—3 of Figs. 1 and 2; Fig. 4 is a cross-section taken on a line corresponding to line 4—4 of Fig. 1. Fig. 5 is a detail longitudinal section corresponding to that of Fig. 2, a round shank drill being shown in position in the chuck; and Fig. 6 is a cross-section taken on a line corresponding to line 6—6 of Fig. 5.

Referring to the drawing, the body 1 is chambered to receive the shank of the drill. It is provided at its outer end with longitudinal jaw-slots 2. The jaws 3 are arranged in these slots, as clearly appears in the drawing, the jaws being provided with flat faces, each having a longitudinal central groove therein. The groove 5 of one of the jaws is larger than the groove 4 of the opposite jaw, the groove 5 being curved in cross-section and of sufficient size to receive the round shank of a drill, as clearly appears in Figs. 5 and 6. The groove 5 is adapted to receive the round shank 6 of the drill 7, as clearly appears in Figs. 5 and 6. The groove 4 is adapted to receive the longitudinal rib 9 of the flat drill 8, the opposite rib projecting into the groove 5 of the opposite jaw, so that the flat drill is clamped between the jaws and is centered and held against lateral movement by means of the rib 9 entering the groove 4.

The jaws are provided with inwardly-projecting rests, 10, which are adapted to engage suitable rest-lugs 11 on the flat shank drill, preferably formed by notching the ribs 9. By this means the flat shank drill may be adjusted according to the length of the bit desired and as the same is worn down. This is of advantage, as it has been found practicable to use flat-ribbed bars of "high-speed" steel as drills, so that the machining labor required in forming the same into a drill is reduced to a minimum, it only being necessary to prepare the cutting-point, which is of very great advantage as the difficulty in working the so-called "high-speed" steel is well-known.

The rests 10 are adapted to engage the end of the round shank drill, as clearly appears in Fig. 5, the drill being centered by entering the curved groove 5 of one of the jaws, as described, and is clamped throughout the entire length of the jaws, the thrust being taken up by the rest, as stated.

The jaws are preferably provided with lug-like projections 12 at their inner ends, adapted to engage the body to limit their inward movement into the body. This holds the shank rests in proper position and prevents the jaws falling into the body, when the drill shank is removed. The jaws are preferably tapered outwardly and provided with tapered heads or enlargements 13, adapted to rest on the outer end of the body, these heads taking part of the thrust on the jaws and also providing a conical surface on the jaws for engagement with the clamping-sleeve or nut 14. This clamping sleeve is provided with conical or tapered portions 15 and 16 at its outer and inner ends respectively, the outer clamping portion being adapted to engage the heads or enlargements 13 of the jaws and the inner portions of the bodies of the jaws. The sleeve is threaded upon the body, the threaded portion 17 thereof being preferably located between the tapered portions described.

By thus forming and arranging the parts, they are very economical to produce and at the same time the structure is of great strength and is entirely effective for the purpose, it being adapted to adjustably support the flat shank provided with rest-engaging lugs, or to effectively support the round shank drill. The round shank drill is of the usual construction of drills now on the market.

The flat shank drill is especially adapted for my improved chuck by providing the same with the rest-lugs 11. It is obvious that my improved chuck may be adapted for supporting a flat shank having longitudinal ribs without these stop lug features, although of course it would lack the adjustable feature. By this means I am able to do away with more or less complicated features of chucks adapted to adjustable support drills of this type.

I have illustrated and described my improved chuck in detail in the form preferred by me on account of its simplicity and economy and convenience in use. It is, however, capable of considerable variation in structural details, and as these will be readily understood by those skilled in the art to which this invention relates, I do not attempt to illustrate the same herein.

Having thus described my invention, what I claim as new and desire to secure by Letters Patent, is:

1. In a chuck, the combination with a chambered body having a pair of longitudinal jaw slots in its outer end; a pair of jaws adapted to engage the shank of a drill and receive the thrust thereof, said jaws being tapered and provided with enlargements at their outer ends adapted to rest on the outer end of the body, their inner ends being adapted to rest on the bottom of the said slots of said body and being provided with body-engaging portions at their inner ends to limit their inward movement in the body; and a clamping sleeve having a conical jaw engaging portion at each end thereof threaded upon said body, the threads of said sleeve being located between the said conical portion thereof.

2. In a chuck, the combination with a chambered body having a pair of longitudinal jaw-slots at its outer end; a pair of jaws adapted to engage the shank of a drill and receive the thrust thereof, said jaws being tapered and provided with enlargements at their outer ends adapted to rest on the outer end of the body, their inner ends being adapted to rest on the bottom of the said slots of said body; and a clamping sleeve having a conical jaw engaging portion at each end thereof threaded upon said body, the threads of said sleeve being located between the said conical portions thereof.

3. In a chuck, the combination with a chambered body having a pair of longitudinal jaw slots in its outer end; a pair of jaws adapted to engage the shank of a drill and receive the thrust thereof, said jaws being provided with enlargements at their outer ends adapted to rest on the outer end of the body, their inner ends being adapted to rest on the bottom of the said slots of said body and being provided with body-engaging portions to limit their inward movement; and means for adjusting said jaws.

4. In a chuck, the combination with a chambered body having a pair of longitudinal jaw slots in its outer end; a pair of jaws adapted to engage the shank of a drill and receive the thrust thereof, said jaws being provided with enlargements at their outer ends adapted to rest on the outer end of the body, their inner ends being adapted to rest on the bottom of the said slots of said body; and means for adjusting said jaws.

5. In a chuck, the combination with the body, of a pair of jaws having flat faces with central longitudinal grooves therein and shank rests towards their inner ends arranged in alinement with said grooves whereby they are adapted to engage the end of a drill shank or rest lugs thereon to receive the thrust of the drill; and means for adjusting said jaws.

6. In a chuck, the combination of a chambered body; a pair of jaws, having longitudinal grooves therein, the groove of one of the jaws being larger than the groove of the other, and curved in cross section to receive a round shank, and means for adjusting said jaws.

In witness whereof, I have hereunto set my hand and seal in the presence of two witnesses.

EUGENE COOK. [L. S.]

Witnesses:
LULU GREENFIELD,
GERTRUDE TALLMAN.